Patented Feb. 21, 1950

2,498,474

UNITED STATES PATENT OFFICE 2,498,474

VINYLDIBENZOFURAN POLYMERS

Edward A. Kern and Royal K. Abbott, Jr., Pittsfield, Mass., assignors to General Electric Company, a corporation of New York No Drawing. Application December 11, 1944,
Serial No. 567,786

9 Claims. (Cl. 260—88.5)

The present invention relates broadly to polymers of vinyl compounds and their preparation. More specifically the invention is directed to the production of polymers of vinyl-substituted dibenzofurans such as poly-2-vinyldibenzofuran (poly-2-vinyldiphenylene oxide).

In the copending application of Abbott, Serial No. 567,784, filed concurrently herewith and assigned to the assignee of the present invention, the preparation of vinyl compounds, and more specifically the preparation of vinyl-substituted dibenzofurans, is described and claimed. We have discovered that these monomeric materials may be polymerized and the present invention is specifically directed to the polymerization of the monomeric materials described and claimed in the aforesaid Abbott application.

We have found that the polymerization of vinyl-substituted dibenzofurans, e. g., 2-vinyldibenzofuran, may be accomplished by polymerizing the monomer itself, a solution thereof or in the form of an emulsion or suspension. The readiness and speed of the polymerization depend greatly upon the purity of the monomer. The purer the monomer, the greater is the ease and rate of polymerization and the higher the molecular weight of the polymer. The physical properties of the polymers produced are to a large extent dependent upon the method of polymerization. Polymerizations carried out at high temperatures or at a very rapid rate usually produce a product that is discolored and of low molecular weight. In order to produce valuable polymerization products, careful control of the polymerization is necessary.

The polymerization may be accelerated by the use of catalysts, examples of which are $BF_3$, $SnCl_4$, $SbCl_5$, organic or inorganic peroxides, air, the halogens, oxygen, ozone, the halogen acids, light or short wave length, and substances such as activated carbon or copper which possess large surface areas. Small amounts of solvents have little effect upon the rate of polymerization. Larger amounts tend to favor the formation of short chain lengths and often produce a period of induction causing an interval to elapse between the addition of the catalyst and the beginning of polymerization. The monomer may in general be inhibited by the same inhibiting agents that retard the polymerization of styrene.

The polymers possess in general the physical properties of polystyrene except that the heat-distortion temperature is considerably higher. For example, the heat-distortion temperature of poly-2-vinyldibenzofuran is at least 40° C. higher than polystyrene. It may be cast, pressed, extruded, rolled, machined, injection or pressure molded. In general, it can be treated as any other thermoplastic material. The monomeric 2-vinyldibenzofuran is especially valuable as a solventless varnish or an impregnating medium. Because of its high boiling point, a vacuum can be applied to it without undue loss by vaporization. The impregnated or cast products can then be polymerized in place.

Poly-2-vinyldibenzofuran is in general compatible with the same materials as polystyrene. It can be plasticized in general by the same plasticizers. Its electrical properties are of the same order, making it very valuable for insulation. It is a low loss thermoplastic resin. The polymerization products of 2-vinyldibenzofuran can be employed for the manufacture of products which require a greater degree of heat resistance than styrene, polyethylene, methyl methacrylate, etc. It may be extended in the plastic condition and then cooled. This orientation of the polymer imparts special mechanical properties to films, threads, tubes, ribbons and rods formed in this manner.

Since polyvinyldibenzofuran possesses low loss characteristics, a high dielectric constant, and a flow point in the neighborhood of 120° C., it is especially desirable for use in electrical and electronic equipment.

Where softening point and strength are of secondary importance, softening agents or plasticizers may be added. Such products may be used as synthetic leathers and show the general characteristics of a plasticized vinyl resin.

The polymer may be ground and suitable fillers such as $\alpha$-cellulose, mica dust, oxides of titanium, talc, zinc oxide, magnesium oxide, asbestos, quartz, wood flour, cellulose or wool fibers, etc., may be added to produce a desirable molding compound.

The following examples will further illustrate how the invention may be carried out in practice but the invention is not restricted by these examples:

Example 1

9 g. of potassium hydroxide, 3 g. potassium carbonate and 3 g. of potassium persulfate are added to 200 g. of water. This solution is mixed vigorously with 4.7 g. stearic acid dissolved in 100 g. of 2-vinyldibenzofuran. The resulting emulsion is heated at 65° C. for 24 hours with constant shaking. After precipitating, the polymer is dissolved in benzene and reprecipitated. White, powdery poly-2-vinyldibenzofuran is obtained in good yield. Instead of potassium persulfate there may also be employed, as catalysts, any persulfate, or an organic or inorganic peroxide, perborates, ozone, oxygen, air or other agents supplying oxygen. The amount of the aqueous layer and the nature of the emulsifying agent may be varied within wide limits.

Example 2

50 g. of 2-vinyldibenzofuran is dissolved in 50 g. of chlorobenzene. ½ of 1% of lauroyl peroxide is added and the resulting solution is subjected to a temperature of 100° C. for 48 hours. A very viscous solution is obtained from which the polymer is obtained by precipitation with methyl alcohol.

Example 3

100 g. of 2-vinyldibenzofuran is heated at 80° C. for 24 hours. A clear glassy solid is obtained. This mass may be ground, a filler added and a valuable molding compound produced. The polymer may also be dissolved and precipitated in such a way that about 30% of the shorter chain length polymer remains in solution. The resulting polymer is of longer chain length and possesses improved physical properties.

Example 4

100 g. of 2-vinyldibenzofuran is dissolved in 100 g. of chlorobenzene. Ten drops of the addition compound of $BF_3$ and diethylether are dissolved in 50 g. of chlorobenzene and this solution added to the solution of monomer in monochlorobenzene. The monomer begins to polymerize at once with the vigorous evolution of heat. The monomer is completely converted to a polymer of relatively low molecular weight.

Example 5

100 g. of 2-vinyldibenzofuran which has been recrystallized from petroleum ether is heated at 65° C. for 12 hours. A hard, clear, glassy mass is obtained. If this mass is dissolved in benzene and then precipitated in such a manner that 20% of the lower molecular weight polymers are not precipitated, the resulting polymer is of high molecular weight. This material yields a polymer which has high impact and flexural strength and a heat-distortion point above 120° C. The hard, glassy mass also provides an exceptional base for a molding powder.

Example 6

100 g. of 2-vinyldibenzofuran is dissolved in 150 g. of toluene and a little gaseous boron trifluoride is added in a current of nitrogen. The polymerization is carried out at 10° C. with constant agitation. The beginning of the polymerization is marked by an increase in temperature. This first reaction takes place with vigorous cooling so that the temperature does not rise more than 5° C. When this first reaction subsides, a little more boron trifluoride is introduced. This process is repeated until there is no evidence of further reaction. The whole polymerization mass is then allowed to stand at 10° C. for 16 hours after which the reaction is essentially complete. This mixture may then be evaporated under vacuum to produce a glassy mass or the polymer can be precipitated out of solution with methyl alcohol.

In place of boron trifluoride its addition compound with an ether, or $SbCl_5$, $SnCl_4$, or HCl may be used.

Example 7

100 g. of 2-vinyldibenzofuran is dissolved in 200 g. of benzene and heated under reflux for four days. The polymer is obtained in the form of a white powder by precipitation with methyl alcohol.

Example 8

100 g. of recrystallized 2-vinyldibenzofuran is heated for 12 hours at 65° C., for 8 hours at 100° C., and for 6 hours at 125° C. A clear, hard mass is obtained. This material is well suited for the preparation of films, coatings, and lacquers. Very pure recrystallized monomeric 2-vinyldibenzofuran hardens after heating at 65° C. for 30 minutes.

Example 9

50 g. of 2-vinyldibenzofuran dissolved in 50 cc. of benzene was heated under reflux in the presence of 2 cc. of concentrated HCl for 96 hours. A viscous, yellowish solution is obtained from which the polymer is obtained in the form of a yellowish powder in good yield. This polymer can be purified by redissolving and precipitating with methyl alcohol. The resulting polymer is of low molecular weight and is useful in that it readily undergoes chemical transformations; as, for example, chlorination, nitration and sulphonation, and these products may be used as softeners for poly-2-vinyldibenzofuran.

Example 10

A mixture of 300 g. of 2-vinyldibenzofuran, 100 g. of water, and 3 g. of sodium peroxide is heated at 140° C. for 24 hours in a pressure-tight vessel. The resulting reaction product is ground, washed with water, and then extracted with methanol to remove any unpolymerized 2-vinyldibenzofuran. In this case the amount of the aqueous layer and the nature of the catalyst may be varied within wide limits. Instead of a peroxide, oxygen, air, ozone, or an oxygen-supplying compound may be used. When this polymer is dissolved in suitable solvent it yields solutions which may be worked up into glass clear and colorless films. The physical properties of these films may be improved by extending while in the plastic condition and then allowing to cool.

Example 11

A solution of 100 parts of 2-vinyldibenzofuran in 100 parts of trichlorethylene is slowly run into a closed vessel at −10° C. and under reduced pressure containing 100 parts of trichlorethylene in which some drops of the addition compound of $BF_3$ and diethyl ether have been dissolved. By efficient cooling under reflux the temperature is prevented from rising more than 5° C. The polymerization may be promoted by the addition of some additional drops of the $BF_3$-ether addition compound. After 12 hours the polymerization product is precipitated in the form of a white precipitate by the addition of methyl alcohol. The product thus obtained may be used in the manufacture of electrical equipment.

It will be evident from the foregoing examples of the preparation of poly-2-vinyldibenzofuran that polymers may be prepared from the monomeric vinyl-substituted dibenzofurans in a variety of ways, with or without catalysts, at normal, subnormal and elevated temperatures, at atmospheric pressure, reduced pressure and pressures above atmospheric, with or without solvent and with or without softeners or plasticizers.

Although the invention has been specifically illustrated by the use of 2-vinyldibenzofuran as the monomeric material from which polymers are prepared, other vinyl-substituted dibenzofurans may be used, such as, for example, 4-vinyldibenzofuran, the preparation of which is described in the copending application of Abbott above-referred to.

The polymers of the present invention, as noted particularly in the foregoing description and examples, have valuable physical and electrical characteristics, such as high softening point and low power factor of importance in connection with the use of the polymer as dielectric material in high frequency electrical apparatus. The polymers may be dissolved in various solvents and applied to paper, glass cloth and other backing material to form sheets which are useful as dielectrics in capacitors, or they may be used to form films.

What we claim as new and desire to secure by Letters Patent of the United States is:

1. Polymeric 2-vinyldibenzofuran.
2. Polymeric 4-vinyldibenzofuran.
3. The method of preparing a polymeric monovinyldibenzofuran which comprises heating a monovinyldibenzofuran.
4. The method of preparing polymeric 2-vinyldibenzofuran which comprises heating 2-vinyldibenzofuran.
5. The method of preparing a polymeric monovinyldibenzofuran which comprises heating a monovinyldibenzofuran in the presence of a polymerization catalyst.
6. The method of preparing a new synthetic composition which comprises heating 2-vinyldibenzofuran under superatmospheric pressure in an aqueous medium containing a polymerization catalyst which supplies oxygen under the conditions of polymerization, and isolating the resulting polymeric 2-vinyldibenzofuran.
7. The method of preparing a new synthetic composition which comprises heating an emulsion containing 2-vinyldibenzofuran and a polymerization catalyst which supplies oxygen under the conditions of polymerization, and isolating the resulting polymeric 2-vinyldibenzofuran.
8. A polymeric monovinyldibenzofuran.
9. The process which comprises applying heat to monomeric 2-vinyldibenzofuran in the presence of a polymerization catalyst until a polymer is formed.

EDWARD A. KERN.
ROYAL K. ABBOTT, Jr.

REFERENCES CITED

The following references are of record in the file of this patent:

FOREIGN PATENTS

| Number | Country | Date |
| --- | --- | --- |
| 487,604 | Great Britain | June 22, 1938 |